US012741709B2

(12) United States Patent
Gildert

(10) Patent No.: US 12,741,709 B2
(45) Date of Patent: Sep. 22, 2026

(54) SYSTEMS, DEVICES, AND METHODS FOR A HUMANOID ROBOT

(71) Applicant: Sanctuary Cognitive Systems Corporation, Vancouver (CA)

(72) Inventor: Suzanne Gildert, Vancouver (CA)

(73) Assignee: Sanctuary Cognitive Systems Corporation, Vancouver (CA)

(*) Notice: Subject to any disclaimer, the term of this patent is extended or adjusted under 35 U.S.C. 154(b) by 422 days.

(21) Appl. No.: 18/373,089

(22) Filed: Sep. 26, 2023

(65) Prior Publication Data

US 2024/0109612 A1 Apr. 4, 2024

Related U.S. Application Data

(60) Provisional application No. 63/412,325, filed on Sep. 30, 2022.

(51) Int. Cl.

| | |
|---|---|
| ***B62D 57/032*** | (2006.01) |
| ***B60L 50/60*** | (2019.01) |
| ***B60P 3/06*** | (2006.01) |

(52) U.S. Cl.

CPC ............ *B62D 57/032* (2013.01); *B60L 50/60* (2019.02); *B60P 3/06* (2013.01)

(58) Field of Classification Search

CPC ... B62D 57/032; B60L 50/60; B60L 2260/32; B60P 3/06; B25J 9/14; B25J 5/007

See application file for complete search history.

(56) References Cited

U.S. PATENT DOCUMENTS

| | | | | |
|---|---|---|---|---|
| 4,682,969 A * | 7/1987 | Choy | A63H 33/003 | |
| | | | 446/376 | |
| 10,398,055 B1 * | 8/2019 | Tandon | G06Q 30/016 | |
| 10,946,528 B2 * | 3/2021 | Gupta | B25J 11/0005 | |
| 12,263,591 B1 * | 4/2025 | Clerc | B25J 9/162 | |
| 12,427,648 B2 * | 9/2025 | Narasaki | B25J 9/0087 | |
| 2004/0162636 A1 * | 8/2004 | Hattori | B62D 57/032 | |
| | | | 318/568.11 | |
| 2019/0366556 A1 * | 12/2019 | Wang | B25J 15/0293 | |
| 2019/0366558 A1 * | 12/2019 | Gupta | B25J 11/009 | |
| 2023/0085731 A1 * | 3/2023 | Shannon | B25J 18/00 | |
| | | | 294/131 | |
| 2024/0294219 A1 * | 9/2024 | Gildert | B60L 58/12 | |

FOREIGN PATENT DOCUMENTS

| | | | | |
|---|---|---|---|---|
| CN | 106043488 A | * | 10/2016 | |
| CN | 108127640 A | * | 6/2018 | B25J 5/007 |
| CN | 119305650 A | * | 1/2025 | B25J 19/0054 |
| CN | 120056065 A | * | 5/2025 | A01D 46/30 |
| DE | 102020107018 A1 | * | 9/2021 | B25J 19/0029 |
| JP | 2005193335 A | * | 7/2005 | |
| JP | 2021049633 A | * | 4/2021 | |
| WO | WO-2023210730 A1 | * | 11/2023 | B25J 5/007 |

* cited by examiner

*Primary Examiner* — Drew J Brown

(74) *Attorney, Agent, or Firm* — Thomas Mahon; Adenike Adebiyi

(57) ABSTRACT

A robot includes a robot body having a first robotic leg, a second robotic leg, and a robotic torso. The first robotic leg includes a first foot, a first lower leg member coupled to the first foot, and a first upper leg member coupled to the first lower leg member. The second robotic leg includes a second foot, a second lower leg member coupled to the second foot, and a second upper leg member coupled to the second lower leg member. The robot includes a mobile base having a platform to which the first and second feet of the robot body are fastened.

12 Claims, 10 Drawing Sheets

SYSTEMS, DEVICES, AND METHODS FOR A HUMANOID ROBOT

CROSS-REFERENCES TO RELATED APPLICATIONS

This application claims the benefit of U.S. Provisional Application No. 63/412,325 filed Sep. 30, 2022, the disclosure of which is incorporated herein by reference.

TECHNICAL FIELD

The present systems, devices, and methods generally relate to a humanoid robot, and, in particular, relate to a mobile robot.

BACKGROUND

Robots are machines that can assist humans or substitute for humans. Robots can be used in diverse applications including construction, manufacturing, monitoring, exploration, learning, and entertainment. Robots can be used in dangerous or uninhabitable environments, for example.

Some robots are stationary robots. Stationary robots are not mobile and typically operate at a fixed location. Examples include stationary robots at a manufacturing plant.

Other robots are mobile robots. Mobile robots are capable of motion. Examples include mobile rescue robots, firefighting robots, and robots able to mimic human behavior. Some mobile robots are self-propelled. Some self-propelled mobile robots are capable of autonomous motion.

Some mobile robots are wheeled robots. Other mobile robots are legged robots. Legged robots may be one-legged, two-legged, or many-legged. A two-legged robot is also referred to in the present application as a bipedal robot. A bipedal robot may be a humanoid robot, for example. Legged robots may be more challenging to implement than wheeled robots, but can provide advantages, for example, on uneven terrain, stairs, and other places requiring agility in motion, as well as for accessing places designed for human access.

SUMMARY

In a representative example, a robot includes a mobile base having a platform. The robot includes a robot body comprising a first robotic leg, a second robotic leg, and a robotic torso. The first robotic leg includes a first foot, a first lower leg mechanically coupled to the first foot, and a first upper leg member mechanically coupled to the first lower leg member. The second robotic leg includes a second foot, a second lower leg member mechanically coupled to the second foot, and a second upper leg member mechanically coupled to the second lower leg member. The first and second feet are fastened to the platform. The robotic torso is mechanically coupled to the first upper leg member and the second upper leg member.

In another representative example, a method of robot operation includes securely fastening a first foot of a first robotic leg and a second foot of a second robotic leg of a robot body to a platform of a mobile base. While the first foot and the second foot of the robot body are securely fastened to the mobile base, one or more degrees of freedom of the robot body are actuated to cause the robot body to perform a task.

In another representative example, a robot may be summarized as comprising a robot body, the robot body comprising a torso, a first robotic arm mechanically coupled to the torso, a first robotic leg, an upper end of the first robotic leg mechanically coupled to the torso, the first robotic leg comprising a first joint, and a second robotic leg, an upper end of the second robotic leg mechanically coupled to the torso, the second robotic leg comprising a second joint, and a base, a lower end of the first robotic leg mechanically coupled to the base and a lower end of the second robotic leg mechanically coupled to the base, wherein the base houses a plurality of components, at least one component of the plurality of components coupled to the robot body.

BRIEF DESCRIPTION OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

DETAILED DESCRIPTION

Figure 1:
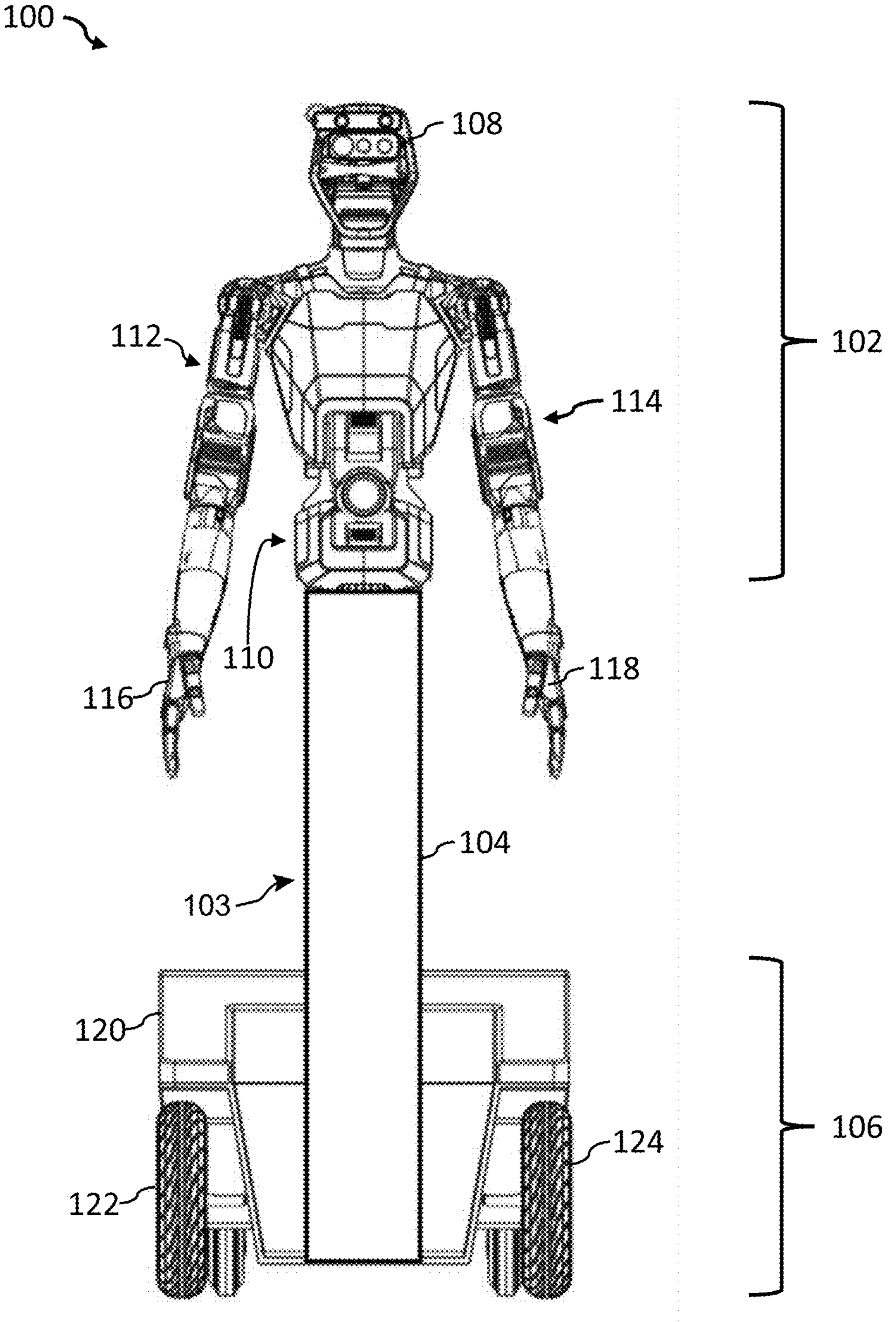
FIG. 1 is a schematic drawing of an example implementation of a robot, in accordance with the present systems, devices, and methods.

The following description sets forth specific details in order to illustrate and provide an understanding of various implementations and embodiments of the present systems, devices, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

Example I—Overview

The technology described herein includes systems and methods for humanoid robots. In some implementations, a dexterous torso is mechanically coupled to a pedestal, and the pedestal is mounted on a base. The base may be a mobile base. The degree of mobility may vary. For example, some robots may be constrained to move along a fixed track. Others may, for example, be capable of autonomous and unconstrained movement in their environment. The mobile base may be a wheeled mobile base. The base may carry various components in support of robot operation, for example, components of a hydraulic system, a controller, computing resources, a battery, an electric motor, etc. The base may serve as a mobile ancillary unit capable of carrying components that would otherwise be too bulky or heavy to include in the robot.

In other implementations, the humanoid robot includes a robot body having two legs. The legs may be mechanically coupled to a base, for example, a wheeled mobile base. The legs may be mounted on, affixed to, and/or tethered to the base. The legs may be actuatable, i.e., operable to perform an action. The action may include a bending of a leg, for example. The legs may have actuators at a hip, knee, and/or ankle joint. The legs may have feet, and the feet may be mounted on the base. In some implementations, the torso is actuatable. For example, the back may bend and/or twist with respect to the legs.

An advantage of a bipedal robot is that it can bend forward to pick up an object, for example. In some implementations, a bipedal robot is able to articulate its legs and torso at one or more joints to interact with the ground, and with objects on the ground or low to the ground. For example, a bipedal robot may be able to bend the torso, as well as bend at the waist, the hips, the knees and/or the ankles. This capability can increase the range of work that can be assigned to the robot. It can also facilitate testing and experimentation with concepts useful for an autonomous walking biped robot, for example, positioning, adjusting height (e.g., for grasping objects), balance and counterbalance in motion, etc. The base can assist in securely anchoring the robot body to prevent tipping over, for example.

Example II—Example Robot Body on a Mobile Robot Pedestal

FIG. 1 is a schematic drawing of an example implementation of a robot 100, in accordance with the present systems, devices, and methods. The robot 100 includes a robot body 102 and a mobile robot pedestal 103 including a pedestal 104 and a mobile base 106. The robot body 102 is attached to the pedestal 104 so that the robot 100 can navigate a space by movement of the mobile base 106.

The robot body 102 includes a head 108, a robotic torso 110, robotic arms 112 and 114, and robotic hands 116 and 118. The head 108 can include one or more vision sensors, for example, to capture information in the environment of the robot. In some implementations, the robotic torso 110 can house hydraulic drive mechanisms that can provide movement to parts of the robot. In the illustrated example, the robotic arms 112 and 114 are humanoid arms. In other implementations, the robotic arms 112 and 114 can have a form factor that is different from a form factor of a humanoid arm. In the illustrated example, the robotic hands 116, 118, which can also be referred to herein as end effectors, are humanoid hands. In other implementations, the robotic hands 116 and 118 can have a form factor that is different from a form factor of a humanoid hand. Each of the robotic hands 116 and 118 can have one or more digits (e.g., fingers, thumb, or similar structures of a hand or end effector).

In some examples, the mobile base 106 can be a wheeled base having a chassis 120 and wheels 122 and 124. In other implementations, the mobile base 106 can have another suitable means for providing mobility of the robot 100. For example, the mobile base 106 may include one or more caterpillar tracks and/or rollers. The base 106 may contain, support, and/or carry various components such as described, for example, with reference to FIGS. 6 and 9 (see Examples V and VIII).

Example III—Example Bipedal Robot on a Mobile Base

Figure 2:
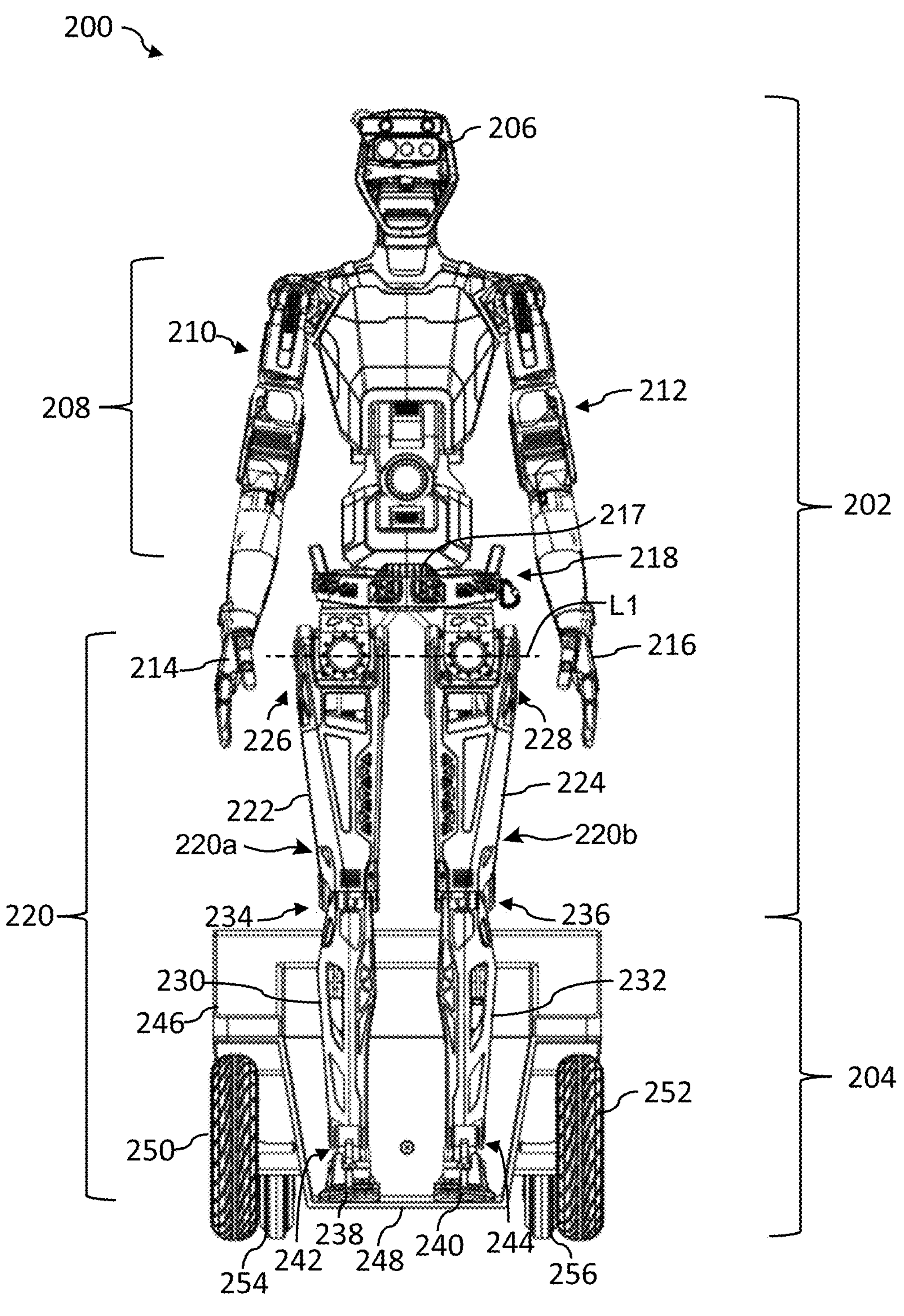
FIG. 2 is a schematic drawing of a front view of another example implementation of a robot, in accordance with the present systems, devices, and methods.
Figure 3:
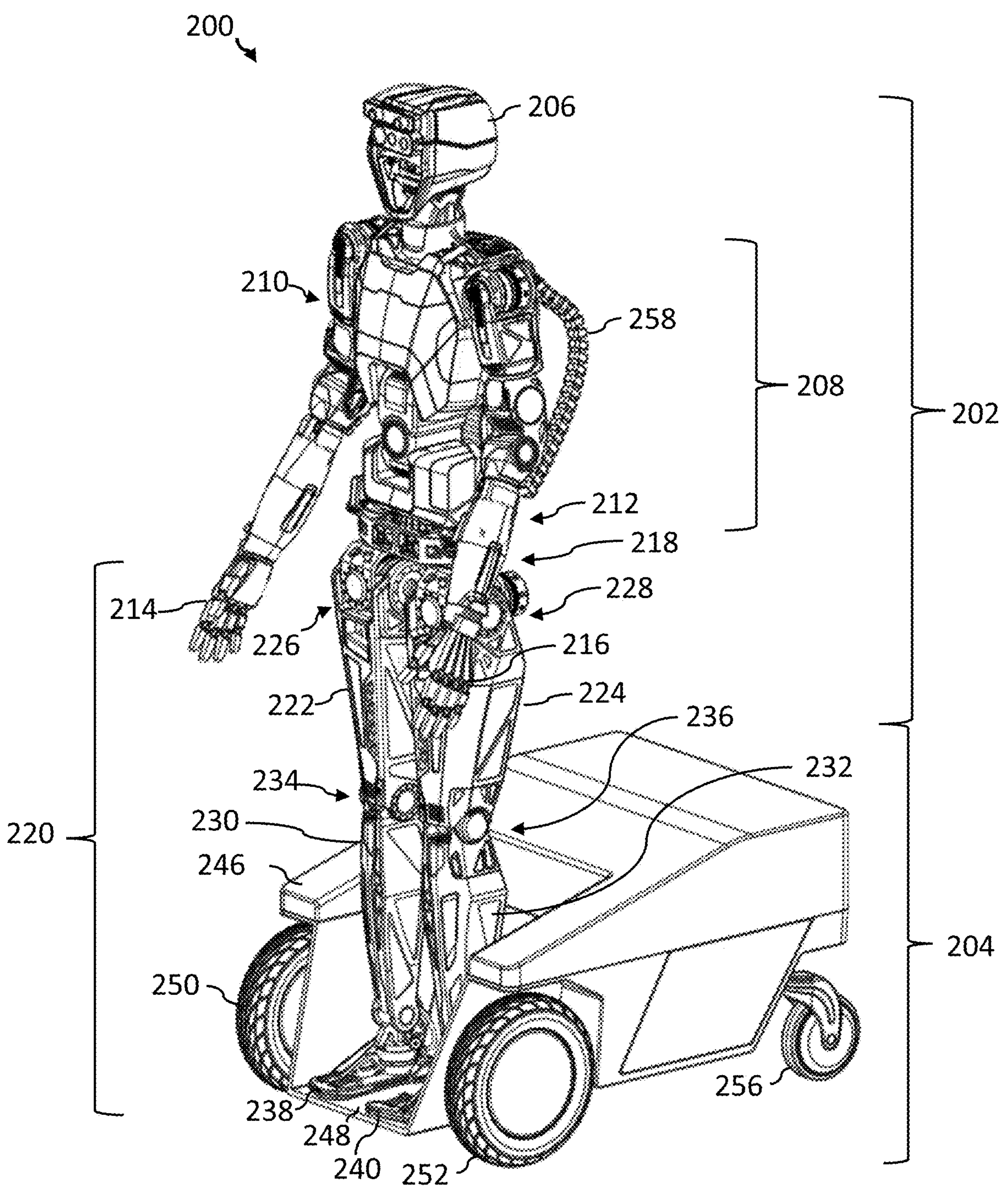
FIG. 3 is a schematic drawing of an isometric view of the robot of FIG. 2, in accordance with the present systems, devices, and methods.
Figure 4:
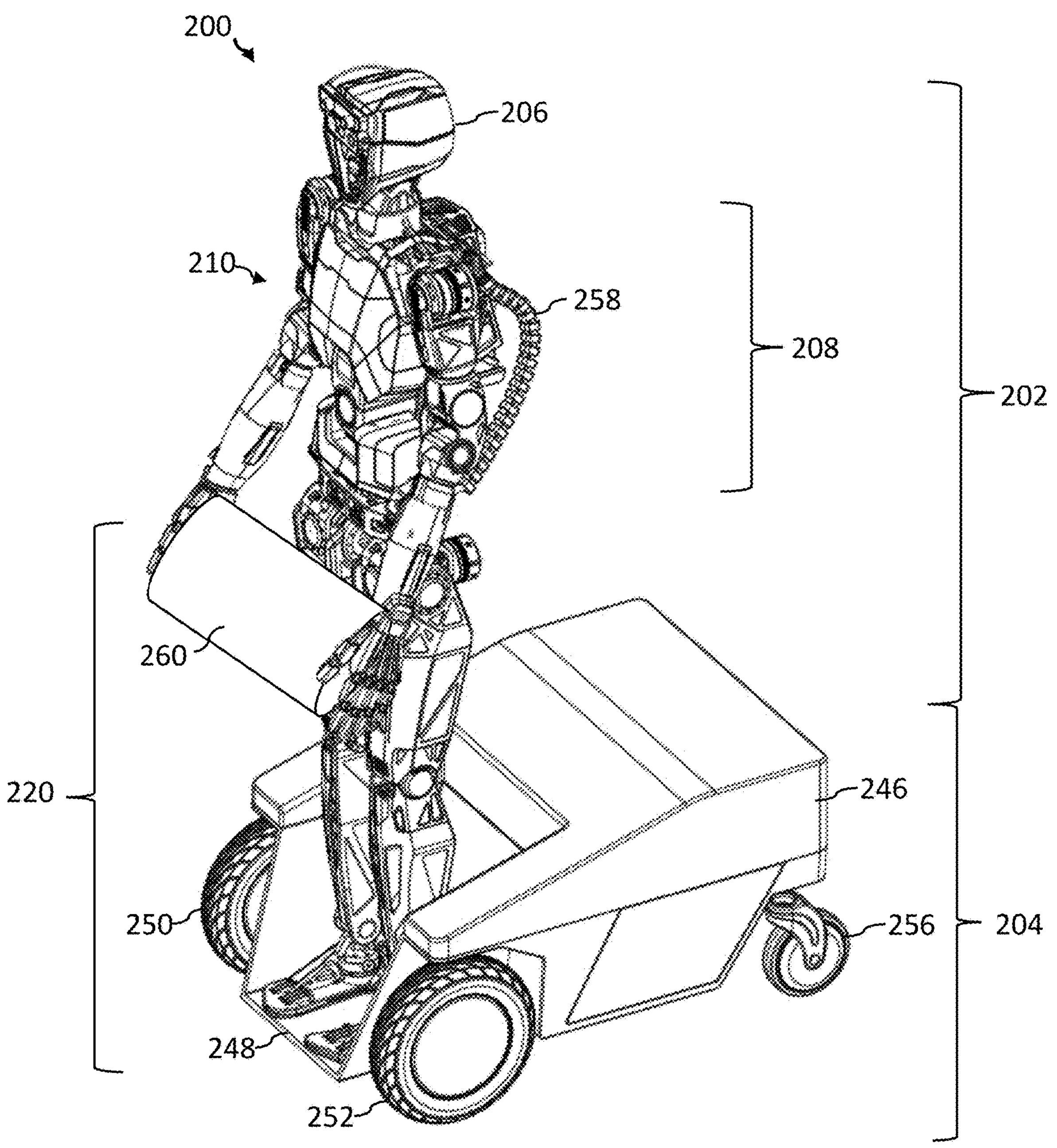
FIG. 4 is a schematic drawing of the robot of FIG. 2 carrying a load, in accordance with the present systems, devices, and methods.

FIG. 2 is a schematic drawing of a front view of another example implementation of a robot 200, in accordance with the present systems, devices, and methods. The robot 200 is also shown in FIGS. 3, 4, and 5 described below. Elements of the robot 200 in FIGS. 3, 4, and 5 have the same reference numerals as the corresponding elements of the robot 200 in FIG. 2. The robot 200 of FIGS. 2, 3, 4, and 5 is described below with reference to FIG. 2.

The robot 200 includes a robot body 202 and a mobile base 204. The robot body 202 is coupled to the base 204 so that the robot 200 can navigate a space by movement of the mobile base 204. In some examples, the robot body 202 is a bipedal robot but the controls for the robotic legs of the robot body 202 may not be developed enough to enable the robot body 202 to walk with the robotic legs. In this case, the mobile base 204 can provide the desired mobility to the robot body 202. In some examples, the robot body 202 can perform tasks while on the mobile base 204, and data collected while the robot body 202 performs tasks can be used to train a bipedal robot to walk.

The robot body 202 includes a head 206 (which can be similar to the head 108 in Example II), a robotic torso 208 (which can be similar to the robotic torso 110 in Example II), robotic arms 210 and 212 (which can be similar to the robotic arms (112, 114 in Example II), and robotic hands 214 and 216 (which can be similar to the robotic hands 116, 118 in Example II). The robot body 202 includes robotic legs 220*a*, 220*b* coupled to the robotic torso 208 by a joint member 218. A joint 217 can be formed between the robotic torso 208 and the joint member 218 that allows the robotic torso 208 to rotate relative to the joint member 218. The joint 217 can be an actuatable joint (e.g., can include an actuator that can be controlled). The joint 217 can allow rotation of the robotic torso 208 relative to the joint member 218.

The robotic leg 220*a* includes an upper leg member 222, a lower leg member 230, and a foot 238. The upper leg member 222 is coupled to the joint member 218 by a hip joint 226. The lower leg member 230 is coupled to the upper leg member 222 by a knee joint 234. The foot 238 is coupled to the lower leg member 230 by an ankle joint 242. The robotic leg 220*b* includes an upper leg member 224, a lower leg member 232, and a foot 240. The upper leg member 224 is coupled to the joint member 218 by a hip joint 228. The lower leg member 232 is coupled to the upper leg member 224 by a knee joint 236. The foot 240 is coupled to the lower leg member 232 by an ankle joint 244.

Figure 5A:
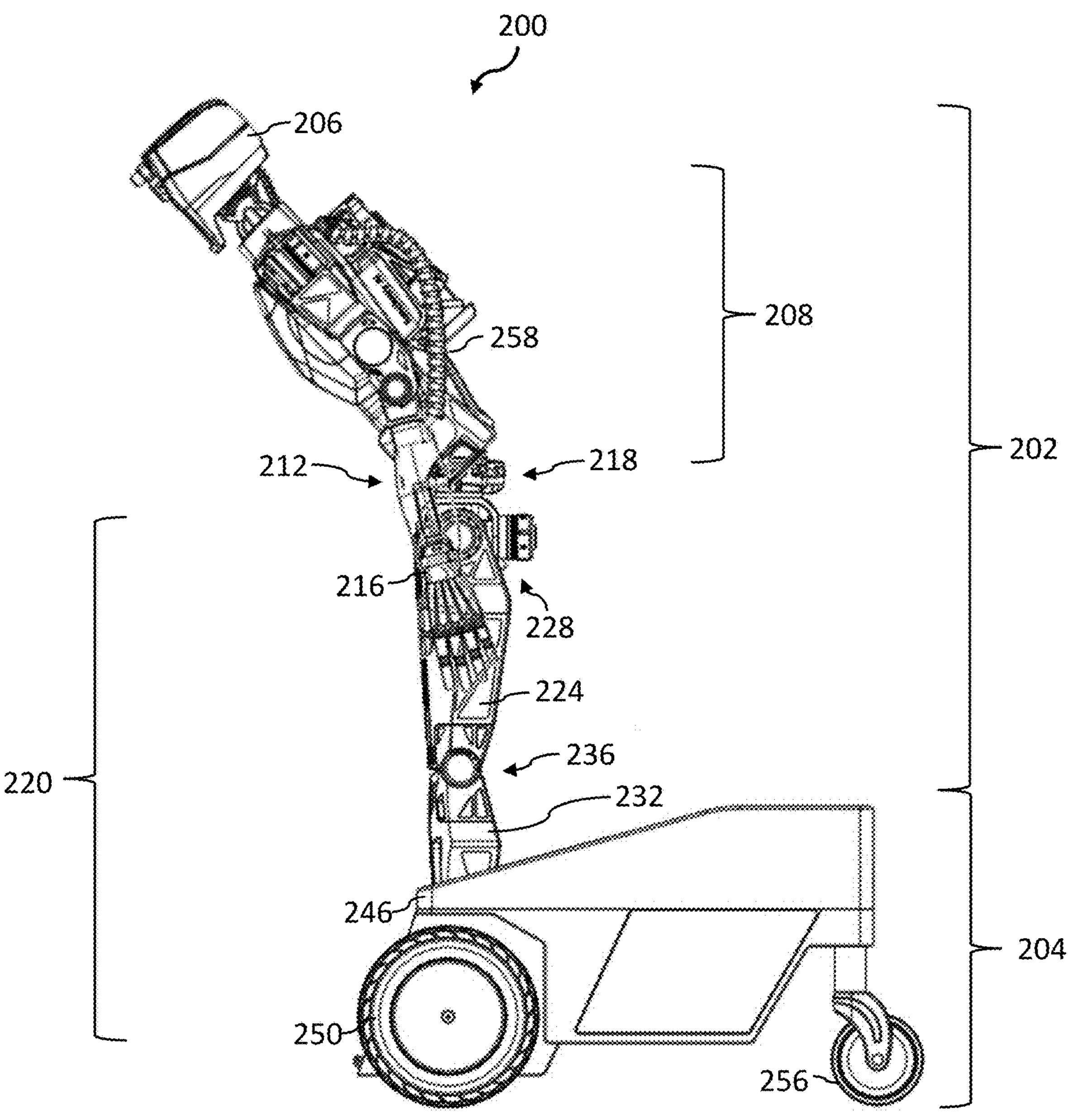
FIG. 5A is a schematic drawing of the robot of FIG. 2 bending forwards, in accordance with the present systems, devices, and methods.

In various implementations, one or more of the hip joints 226 and 228, knee joints 234 and 236, and ankle joints 242 and 244 are actuatable joints. In some examples, each of the hip joints 226 and 228, knee joints 234 and 236, and ankle joints 242 and 244 can include an actuator (e.g., a rotary actuator) providing at least one degree of freedom. In some examples, the hip joints 226, 228 include actuators having rotational axes aligned along a first axis L1. In some examples, the actuators in the hip joints 226, 228 can be controlled to rotate the joint member 218 (and the robotic torso 208) relative to the upper leg members 222, 224 and about the first axis L1 (e.g., to bend the robotic torso 208 forward as shown in FIG. 5A).

The base 204 includes a chassis 246 having a platform 248. The base 204 can also include wheels 250, 252, 254, and 256 or other type of conveyance means (e.g., one or more caterpillar tracks and/or rollers) coupled t the chassis 246. The robot body 202 is mounted on the platform 248 (e.g., by positioning the feet 238 and 240 of the robot body 202 on the platform 248 such that the robot body 202 can stand upright on the platform 248). In some examples, the feet 238 and 240 of the robot body 202 are fastened to the platform 248 (e.g., securely attached to the platform 248 by means of fasteners) while the robot body 202 is mounted on the platform 248. In some examples, the feet 238 and 240 are immovably fixed to the platform 248 while being fastened to the platform 248. In other examples, the feet 238 and 240 can flex while being fastened to the platform 248 (e.g., the feet 238 and 240 can have joints that allow parts of the feet to be pivoted while the feet are fastened to the platform 248). In some examples, the joints of the robotic legs 220*a*, 220*b* can be actuated without unfastening the feet 238, 240 from the platform 248.

In some implementations, the robot 200 includes a hydraulic system to provide power to hydraulically-operated components of the robot (e.g., the robotic hands 214, 216). In one example, as shown in FIG. 3, the hydraulic system can include a hydraulic hose 258, which can be attached to the robot body 202. The hydraulic hose 258 can provide a hydraulic coupling to components of the hydraulic system. In some implementations, some or all of the components of the hydraulic system (including e.g., the hydraulic hose 258) can be adapted and/or miniaturized to fit at least partially inside the robot (e.g., inside the robotic torso 208 and/or robotic arms 210 and 212).

Example IV—Stability of a Bipedal Robot on a Mobile Base

The robot 200 can perform tasks while the robot body 202 is coupled to the mobile base 204 and the feet 238, 240 are fastened to the platform 248 of the mobile base 204. FIG. 4 shows the robot 200 carrying a load 260. The robot 200 may have picked up the load 260, for example, using the robotic hands 214, 216 and robotic arms 210, 212. The load 260 may have been picked up from the ground, or from a shelf, including, for example, a shelf low to the ground or a shelf above the robotic torso 208 such that bending of the torso 208 at the joint member 218 or bending of the robotic legs 200*a*, 200*b* at any of the hip joints 226 and 228, knee joints 234 and 236, and ankle joints 242 and 244 is needed. The load 260 may be an object handed to the robot 200 by a human or another robot.

In some examples, the robot body 202 is configurable in various articulations (e.g., with the joints of the robot 200 at various angles) to allow the robot to engage with the load 260. The base 204 can provide stability for the robot 200 while the robot body 202 is configured in various articulations. For example, the base 204 can have a weight distribution that counterbalances the weight of the robot 200 when the robot body 202 bends, for example, at the joint member 218 or at any of the joints of the robotic legs 200*a*, 200*b* such that the robot body 202 overhangs the platform 248, as shown, for example in FIGS. 5A and 5B. In some implementations, the base 204 has a weight, shape, and/or measurable extent that ensures the robot 200 is stable (e.g., will not tip over) when configured in various articulations and when each of a load weight, shape, and measurable extent are less than a respective determined threshold value.

Figure 5B:
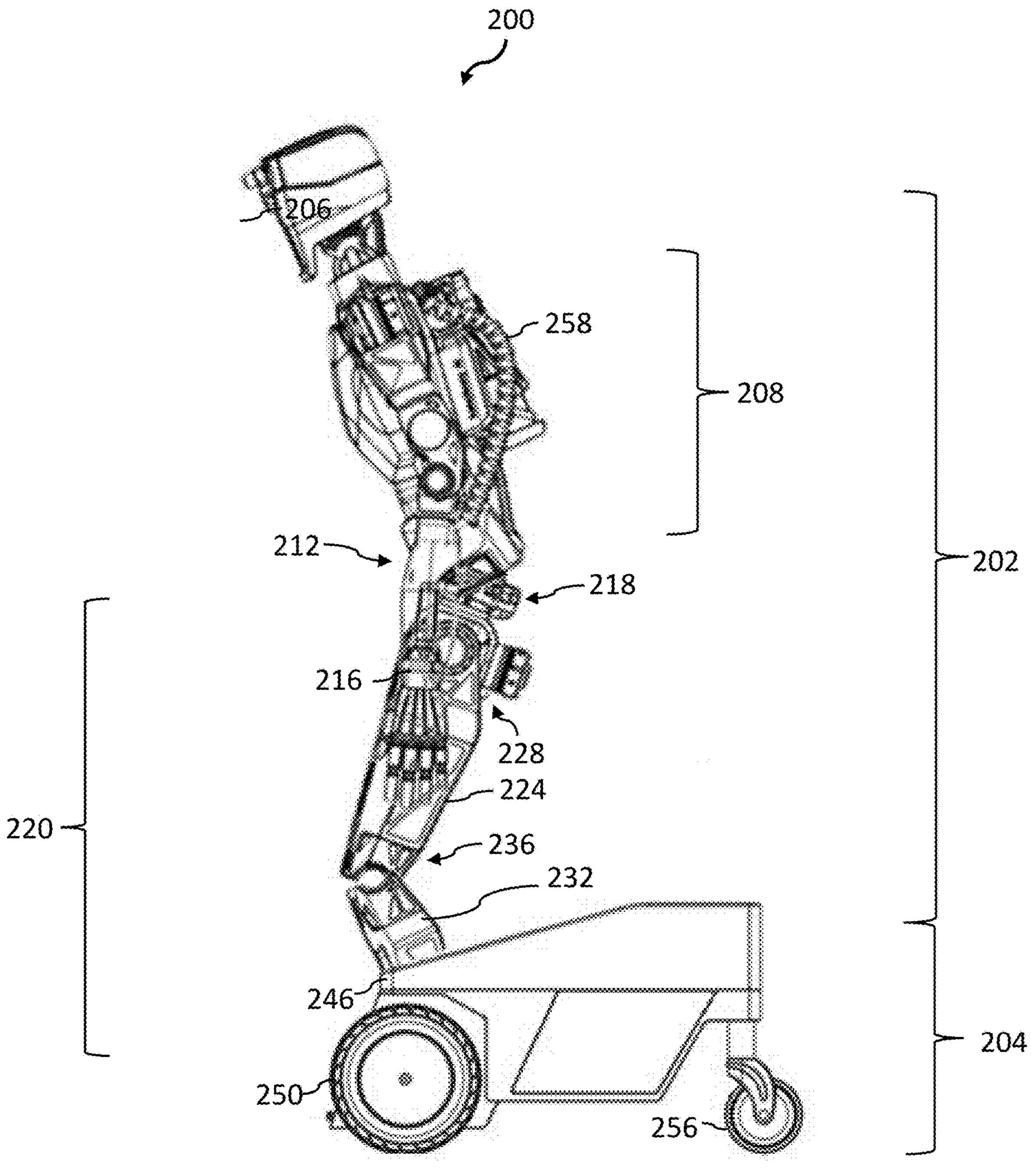
FIG. 5B is a schematic drawing of the robot of FIG. 2 bending at the knee joints, in accordance with the present systems, devices, and methods.

The ability of the robot body 200 to have various articulations, including articulations of the robotic legs 200*a*, 200*b*, while the feet 238 and 240 are fastened to the platform 248 can be advantageous in operation (e.g., while the robot is performing tasks). The ability of the robot 200 to have various articulations while the feet 238 and 240 are fastened to the platform 248 can also be beneficial in developing and training a bipedal robot capable of walking. The various articulations can be configured, for example, using joint member 218, hip joints 226 and 228, knee joints 234 and 236, and ankle joints 242 and 244. For example, FIG. 5B shows that the robot 200 can bend at the knee joints 234, 236 while the feet 238 and 240 are fastened to the platform 248.

Example V—Example Bipedal Robot on a Mobile Base

Figure 6:
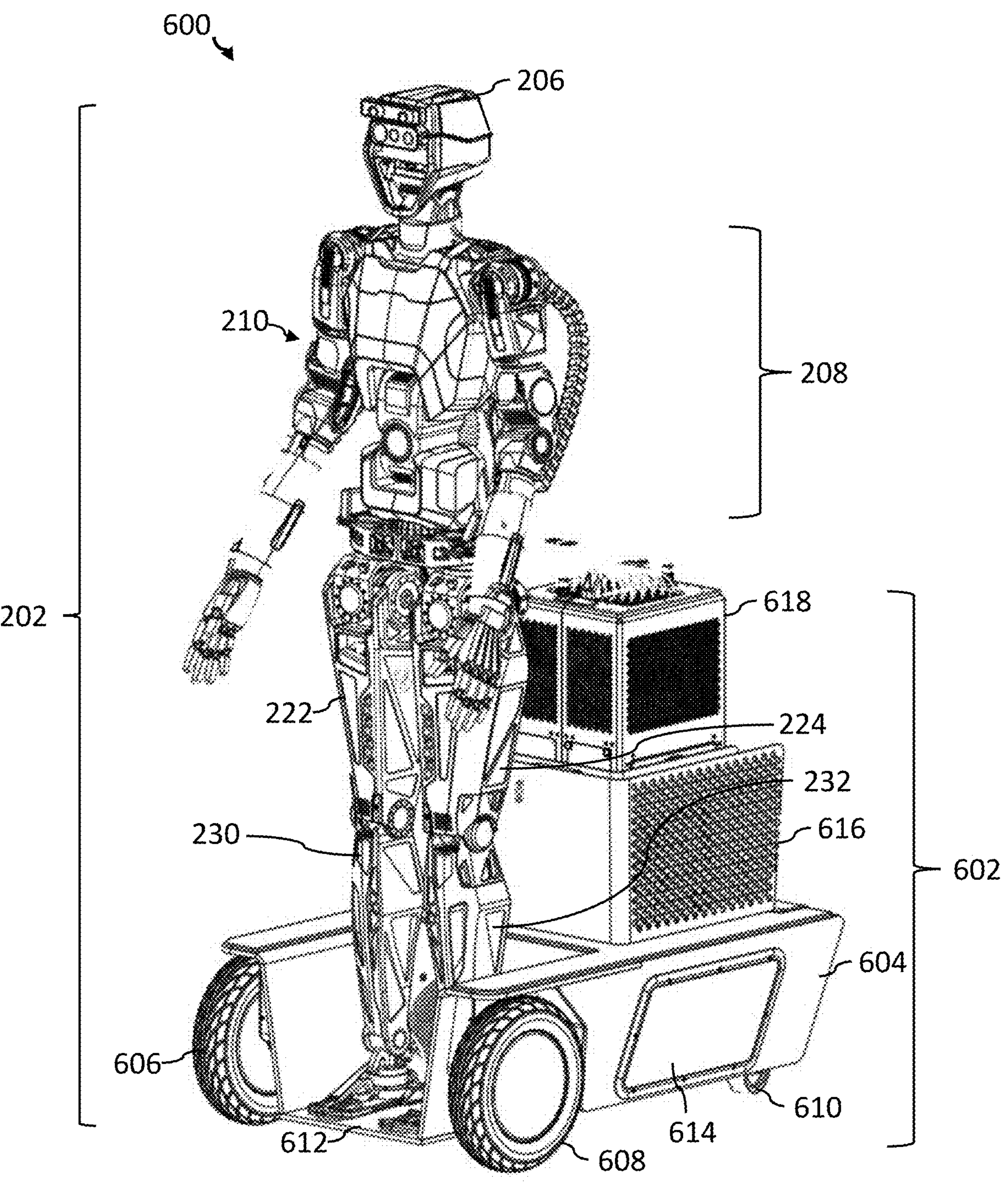
FIG. 6 is a schematic drawing of another example implementation of a robot, in accordance with the present systems, devices, and methods.

FIG. 6 is a schematic drawing of another example implementation of a robot 600, in accordance with the present systems, devices, and methods. The components of the robot 600 that are the same as, or similar to, the components of the robot 200 of FIG. 2 have the same reference numerals.

The robot 600 comprises a robot body 202 (see Example III and FIG. 2) and a mobile base 602. In the illustrated example, the mobile base 602 comprises a chassis 604 and wheels 606, 608, and 610 coupled to the chassis 604. The chassis 604 comprises a platform 612 on which the robot body 202 can be situated. In some implementations, the feet 238 and 240 of the robot body 202 are fastened to the platform 612 while the robot body 202 is mounted on the platform 612 (e.g., by securing the feet 238 and 240 to the platform 612 using fasteners). In some examples, the feet 238, 240 can be rigidly attached to the robot body 202. In other examples, the feet 238 and 240 can flex while being fastened to the platform 612 (e.g., the feet 238 and 240 can have joints that allow parts of the feet to be pivoted while the feet are fastened to the platform 612). In some examples, the joints of the robotic legs 220*a*, 220*b* can be actuated without unfastening the feet 238, 240 from the platform 248.

The chassis 604 can include a hatch 614 that opens to provide access to various components housed in the chassis 604. The base 602 can include components 616 and 618 mounted on the chassis 604. In some implementations, the component 616 can include an electric motor and/or hydraulic or pneumatic components, and the component 618 can include a battery and/or computing resources (e.g., computer processors and/or non-transitory processor-readable storage media). In some examples, the robot body 202 can be communicatively coupled to the components 616, 618. For example, the battery in the component 616 can provide electrical power to the robot body 202.

Example VI—Example Bipedal Robot Seated on a Mobile Base

Figure 7:
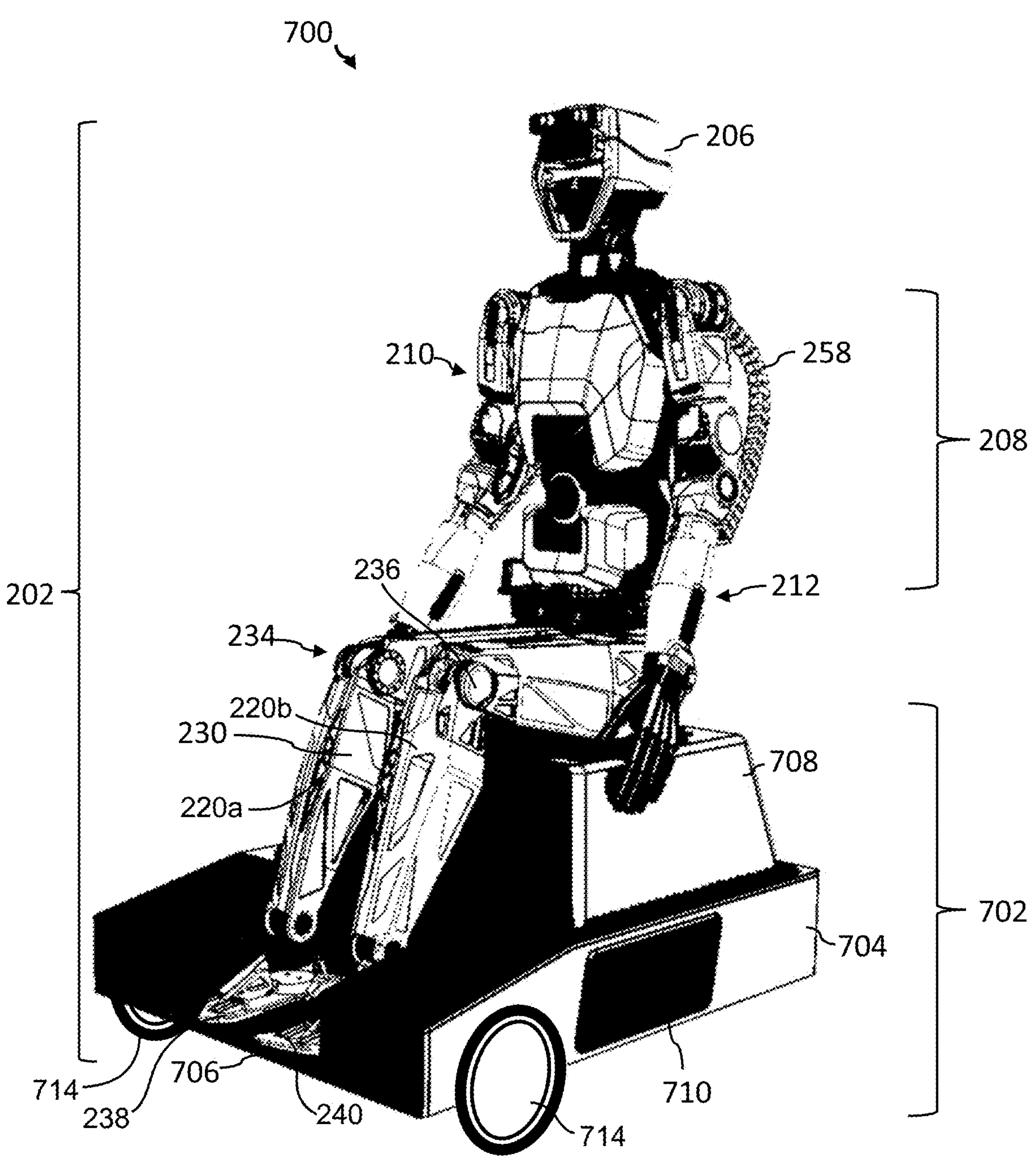
FIG. 7 is a schematic drawing of an example implementation of a robot sitting down, in accordance with the present systems, devices, and methods.

FIG. 7 is a schematic drawing of an example implementation of a robot 700 sitting down, in accordance with the present systems, devices, and methods. Components of robot 700 that are the same as, or similar to, components of robot 200 of FIG. 2 have the same reference numerals.

Robot 700 comprises robot body 202 (see Example III and FIG. 2) and a mobile base 702. The mobile base 702 can include a chassis 704 having a platform 706 and a seat 708. The mobile base 702 can also include wheels 714 or other type of conveyance means (e.g., one or more caterpillar tracks and/or rollers) coupled to the chassis 704. In the illustrated example, the robot body 202 is coupled to the mobile base 702. For example, the feet 238, 240 of the robot body 202 are fastened to the platform 706 as described in Examples III and V. The robot body 202 can sit on the seat 708 of the chassis 704, for example, by bending the knee joints 234, 236.

The base 702 comprises a hatch 710 that can be opened to access various components housed in the chassis 704. In some examples, the components housed in the chassis 704 may include a controller, storage media, components of a hydraulic system, a battery, and/or an electric motor (see Example VIII). In one example, the robot body 202 is operatively coupled to the mobile base 702. For example, the robot body 202 can communicate with components housed in the chassis 704 and can move by operation of the mobile base 702.

Example VII—Example Bipedal Robot with Hydraulically-Powered End Effector

Figure 8:
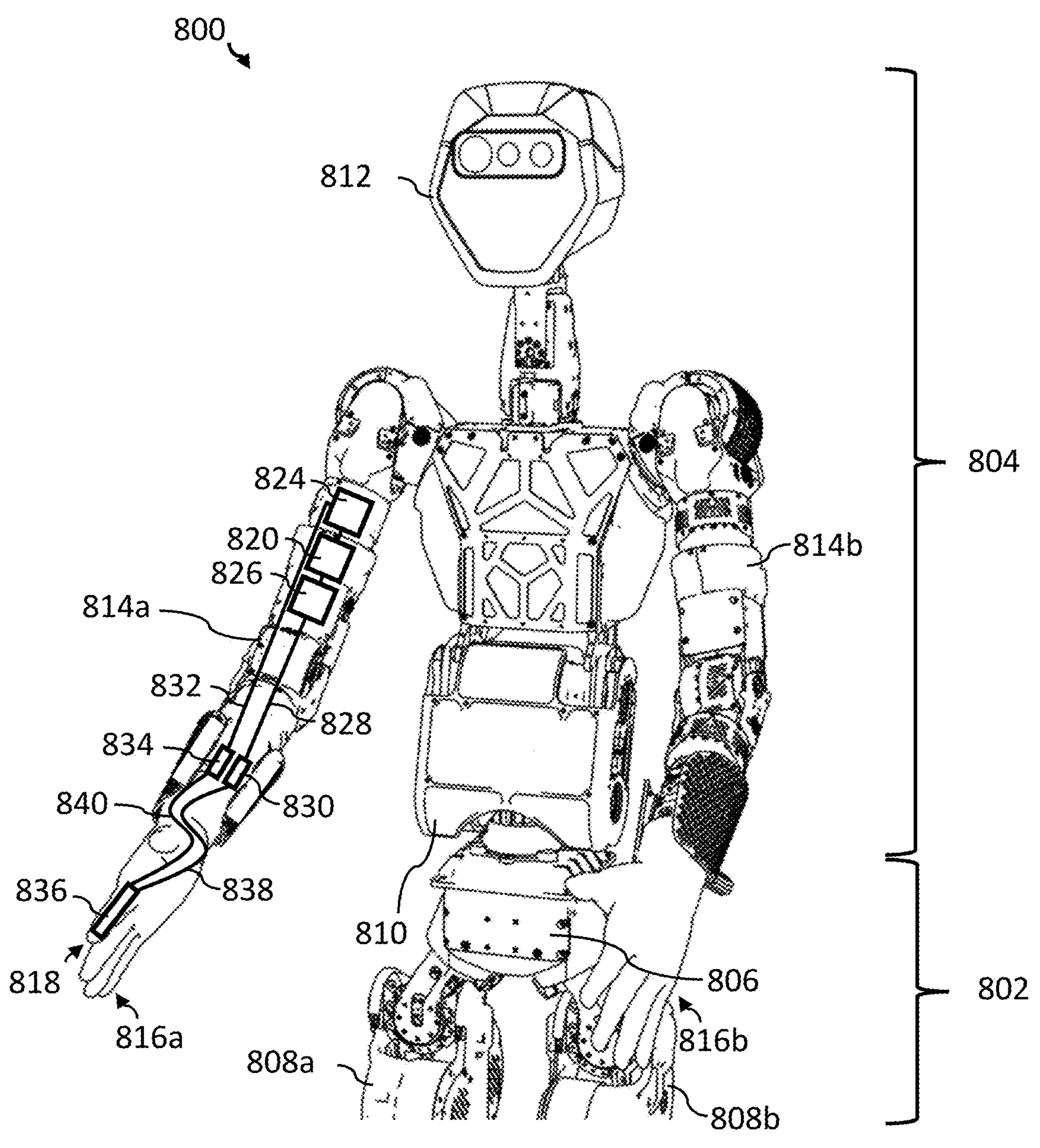
FIG. 8 is a schematic drawing of an example implementation of portion of a hydraulically-powered robot, in accordance with the present systems, devices, and methods.

In some examples, the robot 200 can be a hydraulically-powered robot. FIG. 8 is a schematic drawing of an example implementation of portion of a hydraulically-powered robot 800, in accordance with the present systems, devices, and methods.

The robot 800 comprises a humanoid lower body 802 and a humanoid upper body 804. The lower body 802 comprises a pelvic region 806 and two robotic legs 808*a* and 808*b*. Only the upper portions of the robotic legs 808*a*, 808*b* are shown in FIG. 8. The robotic legs 808*a*, 808*b* can be coupled to a mobile base as described in Examples III to VI.

The upper body 804 comprises a torso 810, a head 812, a right robotic arm 814*a*, a left robotic arm 814*b*, a right hand (or end effector) 816*a*, and a left hand (or end effector) 816*b*. In the illustrated example, the robotic arms 814*a*, 814*b* are humanoid arms. In other implementations, the robotic arms 814*a*, 814*b* can have a form factor that is different from a form factor of a humanoid arm. In the illustrated example, the hands 816*a*, 816*b* are humanoid hands. In other implementations, the hands 816*a*, 816*b* can have a form factor that is different from a form factor of a humanoid hand. Each of the hands 816*a*, 816*b* comprises one or more digits, for example, digit 818 of the hand 816*a*. The digits can include fingers, thumbs, or similar structures of the hand or end effector.

In some examples, the robot 800 is a hydraulically-powered robot. In other implementations, the robot 800 can have alternative or additional power systems. In some implementations, the lower body 802 and/or torso 810 of the upper body 804 can house a hydraulic control system, for example. In some implementations, components of the hydraulic control system may alternatively be located outside the robot, e.g., on a wheeled unit that rolls with the robot as it moves around (see, for example, base 204 of robot 200 of FIG. 2), or in a fixed station to which the robot is tethered.

The hydraulic control system of the robot 800 comprises a hydraulic pump 820, a reservoir 824, and an accumulator 826, housed in, for example, the robotic arm 814*a*. The hydraulic control system includes a hose 828 that provides a hydraulic coupling between the accumulator 826 and a pressure valve 830 of the hydraulic control system. The hose 832 provides a hydraulic coupling between an exhaust valve 834 of the hydraulic control system and the reservoir 824.

The pressure valve 830 is hydraulically coupled to an actuation piston 836 by a hose 838. The actuation piston 836 is hydraulically coupled to an exhaust valve 834 by a hose 840. The hoses 828 and 838, and pressure valve 830, provide a forward path to the actuation piston 836. The hoses 832 and 840, and exhaust valve 834, provide a return path to the actuation piston 836. The pressure valve 830 and exhaust valve 834 can control the actuation piston 836, and can cause actuation piston 836 to move, which can cause a corresponding motion of at least a portion of the hand 816*a*, for example, the digit 818.

Each of the hands 816*a*, 816*b* may have more than one degree of freedom (DOF). In some implementations, each hand has up to eighteen (18) DOFs. Each DOF can be driven by a respective actuation piston (for example, actuation piston 836). For clarity of illustration, only one actuation piston is shown in FIG. 8. Each actuation piston may be located in hands 816.

The digit 818 may include one or more knuckle joints. For example, digit 818 may include one or more of a metacarpophalangeal (MCP) joint, a proximal interphalangeal (PIP) joint, and a distal interphalangeal (DIP) joint. Digit 818 may include a spherical differential joint (e.g., a spherical differential MCP joint). The spherical differential joint of digit 818 may be hydraulically-actuated.

In some implementations, the digit 818 may include multiple actuators. Some actuators may be used to control movement of joints in the digit 818. For example, actuators may be used to control movement of one or more knuckle joints.

The digit 818 may include one or more position transducers operable to provide positional data for the robot 800 to be self-aware of a position of one or more components of the digit 818 with respect to each other, and/or to provide control of the digit 818. Further details regarding the digit

818 can be found in, for example, U.S. patent application Ser. No. 18/197,915 ("Systems, Devices, and Methods for a Robotic Joint").

Example VIII—Control System

Figure 9:
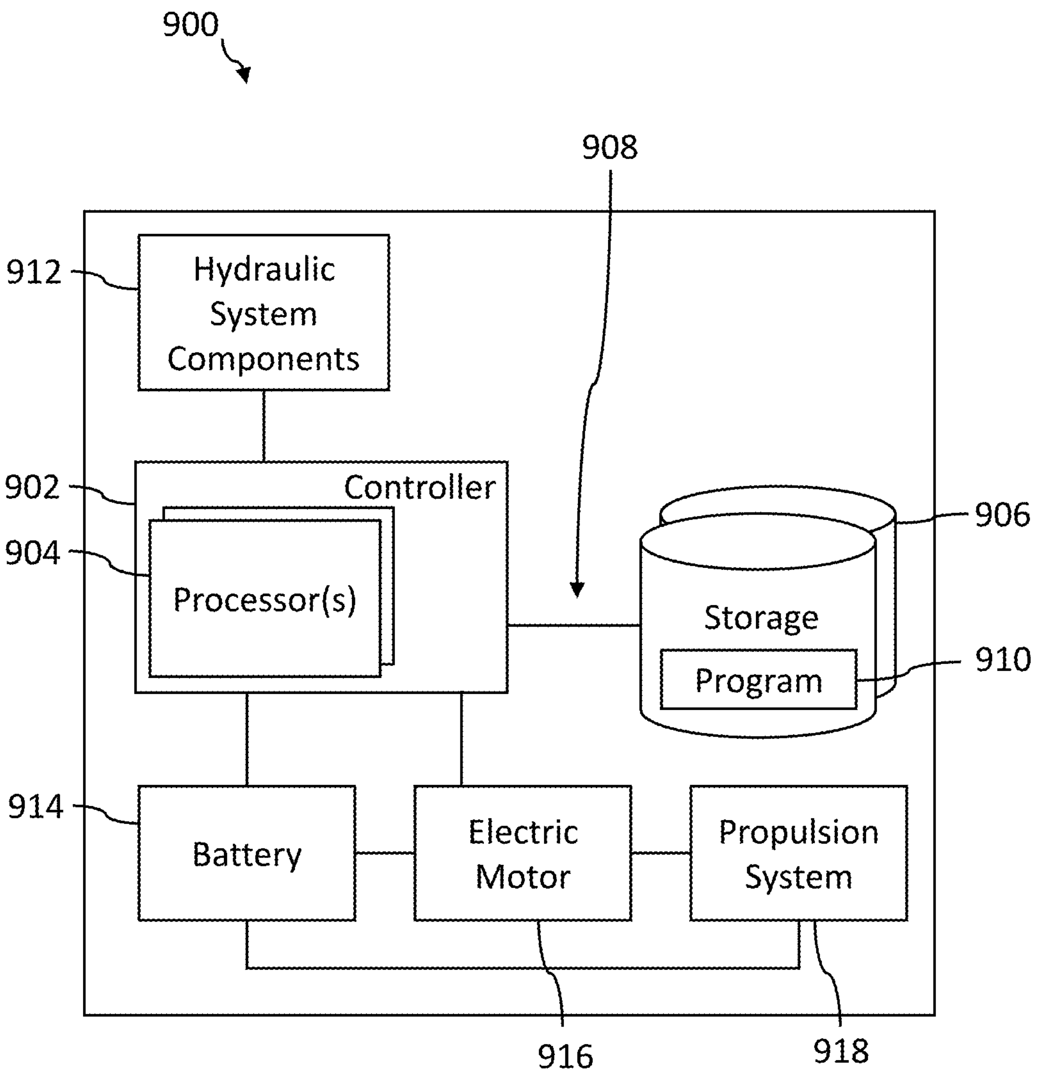
FIG. 9 is a block diagram of an example implementation of a system of components housed in a base of a robot (for example, the robot of FIG. 2, the robot of FIG. 6, or the robot of FIG. 7), in accordance with the present systems, devices, and methods.

FIG. 9 is a block diagram of an example implementation of a system 900 of components housed in a base of a robot (for example, robot 200 of FIG. 2, robot 600 of FIG. 6, or robot 700 of FIG. 7), in accordance with the present systems, devices, and methods. In some examples, the system 900 can control operation of the robot.

The system 900 comprises a controller 902 including at least one processor 904, which may be any logic processing unit, including for example, one or more central processing units ("CPUs"), digital signal processors ("DSPs"), and/or application-specific integrated circuits ("ASICs").

The system 900 further comprises at least one non-transitory processor-readable storage medium 906 communicatively coupled to processor 904 by a bus 908. The storage medium 906 can store instructions and/or data that can be executed by the processor 904. The storage medium 906 can store a computer program product 910 comprising data and processor-executable instructions. The computer program product 910 can cause processor 904 to provide commands to the controller 902 to cause the robot to perform an action and/or a maneuver (e.g., a change in the robot's position and/or orientation in the robot's environment). The storage medium 906 can be any suitable non-volatile storage medium, including for example, a hard disk drive for reading from and writing to a hard disk, a solid state drive, an optical disk drive for reading from and writing to removable optical disks, and/or a magnetic disk drive for reading from and writing to magnetic disks.

The system 900 further comprises one or more components 912 of a hydraulic system, a battery 914, and an electric motor 916. The battery 914 may provide power to components of a robot body to which it is electrically communicatively coupled. The battery 914 may provide power to the electric motor 916 to, for example, drive components of the robot body to which it is communicatively coupled.

The system 900 further comprises a propulsion system 918 which is operable to cause a motion of the mobile base. Motion of the mobile base can cause a change in at least one of a position or an orientation of the robot in the robot's environment. The propulsion system 918 can include the electric motor 916, which can be coupled to the wheels of the base (e.g., through a transmission system), and can draw power from the battery 914.

Example IX—Alternative Implementations

The various implementations described herein may include, or be combined with, any or all of the systems, devices, and methods described in U.S. patent application Ser. No. 18/197,915, U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. patent application Ser. No. 17/749,536, U.S. Provisional Patent Application No. 63/001,755 (Publication No. US 2021-0307170 A1), and/or U.S. Provisional Patent Application No. 63/057,461, as well as U.S. Provisional Patent Application No. 63/151,044, U.S. Provisional Patent Application No. 63/173,670, U.S. Provisional Patent Application No. 63/184,268, U.S. Provisional Patent Application No. 63/213,385, U.S. Provisional Patent Application No. 63/232,694, U.S. Provisional Patent Application No. 63/253,591, U.S. Provisional Patent Application Ser. No. 63/293,968, U.S. Provisional Patent Application No. 63/293,973, U.S. Provisional Patent Application Ser. No. 63/278,817, and/or U.S. patent application Ser. No. 17/566,589, each of which is incorporated herein by reference in its entirety.

Throughout this specification and the appended claims, infinitive verb forms are often used. Examples include, without limitation: "to provide," "to control," and the like. Unless the specific context requires otherwise, such infinitive verb forms are used in an open, inclusive sense, that is as "to, at least, provide," "to, at least, control," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of robotic systems and hydraulic circuits provided.

Example X—Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: A robot comprising: a robot body, the robot body comprising: a torso; a first robotic arm mechanically coupled to the torso; a first robotic leg, an upper end of the first robotic leg mechanically coupled to the torso, the first robotic leg comprising a first joint; and a second robotic leg, an upper end of the second robotic leg mechanically coupled to the torso, the second robotic leg comprising a second joint; and a base, a lower end of the first robotic leg mechanically coupled to the base and a lower end of the second robotic leg mechanically coupled to the base, wherein the base houses a plurality of components, at least one component of the plurality of components coupled to the robot body.

Example 2: A robot according to Example 1, wherein the robot body is a humanoid robot body.

Example 3: A robot according to Example 2, wherein at least one of the first joint or the second joint is one of a hip joint, a knee joint, or an ankle joint.

Example 4: A robot according to Example 1, wherein the first robotic arm comprises a first end effector.

Example 5: A robot according to Example 4, wherein the first end effector is a humanoid hand.

Example 6: A robot according to Example 1, wherein the first robotic leg comprises a first end effector at the lower end of the first robotic leg, the first end effector mounted on the base.

Example 7: A robot according to Example 6, wherein the second robotic leg comprises a second end effector at the lower end of the second robotic leg, the second end effector mounted on the base.

Example 8: A robot according to Example 6, wherein the first end effector is a humanoid foot.

Example 9: A robot according to Example 1, wherein the upper end of the first robotic leg is mechanically coupled to the torso by the first joint.

Example 10: A robot according to Example 9, wherein the upper end of the second robotic leg is mechanically coupled to the torso by the second joint.

Example 11: A robot according to Example 1, wherein the first robotic leg further comprises a third joint.

Example 12: A robot according to Example 11, wherein the second robotic leg further comprises a fourth joint.

Example 13: A robot according to Example 1, wherein the robot body further comprises a second robotic arm, the second robotic arm mechanically coupled to the torso.

Example 14: A robot according to Example 1, wherein the robot comprises a hydraulic system.

Example 15: A robot according to Example 14, wherein the hydraulic system is operable to cause a motion of at least one of the first robotic leg, the second robotic leg, the first robotic arm, the first joint, and/or the second joint.

Example 16: A robot according to Example 14, wherein the at least one of the plurality of components housed in the base is a component of the hydraulic system, the component of the hydraulic system hydraulically coupled to the robot body.

Example 17: A robot according to Example 1, wherein the at least one of the plurality of components housed in the base is a controller, the controller communicatively coupled to the robot body, the controller operable to control an action of the robot body.

Example 18: A robot according to Example 1, wherein the base is a mobile base.

Example 19: A robot according to Example 18, wherein the mobile base is a wheeled base.

Example 20: A robot according to Example 18, wherein the mobile base comprises a propulsion system, the propulsion system operable to cause a motion of the mobile base.

Example 21: A robot according to Example 20, wherein the motion of the mobile base causes a change in at least one of a position or an orientation of the robot in an environment.

Example 22: A robot according to Example 20, wherein the propulsion system comprises a battery.

Example 23: A robot according to Example 20, wherein the propulsion system comprises an electric motor.

Example 24: A robot according to Example 18, wherein the mobile base is capable of autonomous movement.

Example 25: A robot according to Example 1, wherein the lower end of the first robotic leg is fixedly mounted on the base and the lower end of the second robotic leg is fixedly mounted on the base.

Example 26: A robot according to Example 1, the robot body configurable in a plurality of articulations, wherein the base has at least one of a weight, a shape, or a measurable extent to ensure the robot is stable for each of the plurality of articulations of the robot body.

Example 27: A robot according to Example 1, the robot further comprising a load, the load carried by the robot body, the load having a load weight, a load shape, and a load measurable extent, each of the load weight, the load shape and the load measurable extent less than a respective determined threshold value, the robot body configurable in a plurality of articulations, wherein the base has at least one of a base weight, a base shape, or a base measurable extent to ensure the robot is stable for each of the plurality of articulations of the robot body.

Example 28: A robot according to Example 1, wherein the at least one of the plurality of components housed in the base is a battery, the battery electrically communicatively coupled to the robot body, the battery operable to provide electrical power to the robot body.

Example 29: A robot comprising: a mobile base having a platform; and a robot body attached to the mobile base, the robot body comprising: a first robotic leg having a first foot, a first lower leg member mechanically coupled to the first foot, and a first upper leg member mechanically coupled to the first lower leg member, wherein the first foot is fastened to the platform; a second robotic leg having a second foot, a second lower leg member mechanically coupled to the second foot, and a second upper leg member mechanically coupled to the second lower leg member, wherein the second foot is fastened to the platform; and a robotic torso mechanically coupled to the first upper leg member and the second upper leg member.

Example 30: A robot according to Example 29, wherein the first lower leg member is mechanically coupled to the first foot by a first joint having a first degree of freedom, and wherein the first foot remains fastened to the platform during and after actuation of the first degree of freedom.

Example 31: A robot according to Example 30, wherein the second lower leg member is mechanically coupled to the second foot by a second joint having a second degree of freedom, and wherein the second foot remains fastened to the platform during and after actuation of the second degree of freedom.

Example 32: A robot according to Example 29, wherein the first lower leg member is mechanically coupled to the first foot by a first joint having a first degree of freedom, wherein the first upper leg member is mechanically coupled to the first lower leg member by a second joint having a second degree of freedom, wherein the robotic torso is mechanically coupled to the first upper leg member by a third joint having a third degree of freedom, and wherein the first foot and the second foot remain fastened on the platform during and after any combination of actuation of the first, second, and third degrees of freedom.

Example 33: A robot according to Example 33, wherein the second lower leg member is mechanically coupled to the second foot by a fourth joint having a fourth degree of freedom, wherein the second upper leg member is mechanically coupled to the second lower leg member by a fifth joint having a fifth degree of freedom, wherein the robotic torso is mechanically coupled to the second upper leg member by a sixth joint having a sixth degree of freedom, and wherein the first foot and the second foot remain fastened on the platform during and after any combination of actuation of the fourth, fifth, and sixth degrees of freedom.

Example 34: A robot according to Example 29, further comprising a joint member coupled to the robotic torso by a first joint, coupled to the first upper leg member by a second joint, and coupled to the second upper leg member by a third joint.

Example 35: A robot according to Example 34, wherein the first joint includes at least a first actuator controllable to rotate the robotic torso relative to the joint member.

Example 36: A robot according to Example 35, wherein the second joint includes at least a second actuator, wherein the third joint includes at least a third actuator, and wherein the second and third actuators are controllable to rotate the joint member and the robotic torso relative to the first upper leg member and the second upper leg member.

Example 37: A robot according to Example 36, wherein the mobile base has a weight that counterbalances a weight of the robot when the robotic torso and joint member rotate relative to the first upper leg member and the second upper leg member such that the robotic torso overhangs the mobile base.

Example 38: A robot according to Example 29, wherein the robot body further comprises: a robotic arm mechanically coupled to a side of the robotic torso; and an end effector mechanically coupled to the robotic arm, the end effector having at least one digit having at least one degree of freedom.

Example 39: A robot according to Example 38, further comprising a hydraulic system operatively coupled to the end effector to actuate the at least one degree of freedom.

Example 40: A robot according to Example 39, wherein at least one component of the hydraulic system is attached to the robotic torso.

Example 41: A robot according to Example 40, wherein the mobile base further comprises a chassis, and wherein at least one component of the hydraulic system is attached to the chassis.

Example 42: A robot according to Example 29, wherein the mobile base comprises a propulsion system operable to cause motion of the mobile base.

Example 43: A robot according to Example 29, wherein the robot body is a humanoid robot body.

Example 44: A robot according to Example 29, wherein the mobile base houses a plurality of components for operation of the robot, and wherein at least one of the plurality of components is coupled to the robot body.

Example 45: A robot according to Example 44, wherein the plurality of components comprise a battery electrically coupled to the robot body and operable to provide electrical power to the robot body.

Example 46: A robot according to Example 44, wherein the plurality of components comprise a controller communicatively coupled to the robot body and operable to control an action of the robot body.

Example 47: A robot according to Example 44, wherein the mobile base comprises a plurality of wheels, and wherein the plurality of components comprise an electric motor operable to rotate the plurality of wheels.

Example 48: A method of robot operation comprising: securely fastening a first foot of a first robotic leg and a second foot of a second robot leg of a robot body to a platform of a mobile base; and while the first foot and the second foot are securely fastened to the mobile base, actuating one or more degrees of freedom of the robot body to perform a task.

The invention claimed is:

1. A robot comprising:

a mobile base including a chassis and having a platform formed in a front portion of the chassis; and a humanoid robot body comprising:

a first robotic leg having a first foot, a first lower leg member mechanically coupled to the first foot, and a first upper leg member mechanically coupled to the first lower leg member, wherein the first foot is fastened to the platform;

a second robotic leg having a second foot, a second lower leg member mechanically coupled to the second foot, and a second upper leg member mechanically coupled to the second lower leg member, wherein the second foot is fastened to the platform;

a robotic torso mechanically coupled to the first upper leg member and the second upper leg member;

a robotic arm mechanically coupled to a side of the robotic torso; and an end effector mechanically coupled to the robotic arm, the end effector having at least one digit with at least one hydraulically-actuated joint:

a hydraulic system operatively coupled to the at least one hydraulically-actuated joint, the hydraulic system having at least one component attached to the robotic torso; and a plurality of components mounted in a rear portion of the chassis for operation of the robot body, the plurality of components comprising a battery electrically coupled to the robot body and operable to provide electrical power to the robot body and a controller communicatively coupled to the robot body and operable to control an action of the robot body.

2. The robot of claim 1, wherein the first lower leg member is mechanically coupled to the first foot by a first joint having a first degree of freedom, and wherein the first foot remains fastened to the platform during and after actuation of the first degree of freedom.

3. The robot of claim 2, wherein the second lower leg member is mechanically coupled to the second foot by a second joint having a second degree of freedom, and wherein the second foot remains fastened to the platform during and after actuation of the second degree of freedom.

4. The robot of claim 1, wherein the first lower leg member is mechanically coupled to the first foot by a first joint having a first degree of freedom, wherein the first upper leg member is mechanically coupled to the first lower leg member by a second joint having a second degree of freedom, wherein the robotic torso is mechanically coupled to the first upper leg member by a third joint having a third degree of freedom, and wherein the first foot and the second foot remain fastened to the platform during and after any combination of actuation of the first, second, and third degrees of freedom.

5. The robot of claim 4, wherein the second lower leg member is mechanically coupled to the second foot by a fourth joint having a fourth degree of freedom, wherein the second upper leg member is mechanically coupled to the second lower leg member by a fifth joint having a fifth degree of freedom, wherein the robotic torso is mechanically coupled to the second upper leg member by a sixth joint having a sixth degree of freedom, and wherein the first foot and the second foot remain fastened to the platform during and after any combination of actuation of the fourth, fifth, and sixth degrees of freedom.

6. The robot of claim 1, further comprising a joint member coupled to the robotic torso by a first joint, coupled to the first upper leg member by a second joint, and coupled to the second upper leg member by a third joint.

7. The robot of claim 6, wherein the first joint includes at least a first actuator controllable to rotate the robotic torso relative to the joint member.

8. The robot of claim 7, wherein the second joint includes at least a second actuator, wherein the third joint includes at least a third actuator, and wherein the second and third actuators are controllable to rotate the joint member and the robotic torso relative to the first upper leg member and the second upper leg member.

9. The robot of claim 8, wherein the mobile base has a weight that counterbalances a weight of the robot when the robotic torso and joint member rotate relative to the first upper leg member and the second upper leg member such that the robotic torso overhangs the mobile base.

10. The robot of claim 1, wherein at least one component of the hydraulic system is mounted in the rear portion of the chassis.

11. The robot of claim 1, wherein the mobile base comprises a propulsion system operable to cause motion of the mobile base.

12. The robot of claim 1, wherein the mobile base comprises a plurality of wheels and an electric motor operable to rotate the plurality of wheels.

* * * * *